Sept. 3, 1968  S. W. COFFMAN  3,400,305
ALTERNATING CURRENT ELECTRODES FOR ELECTROCHEMICAL POWER CELLS
Filed Aug. 18, 1964
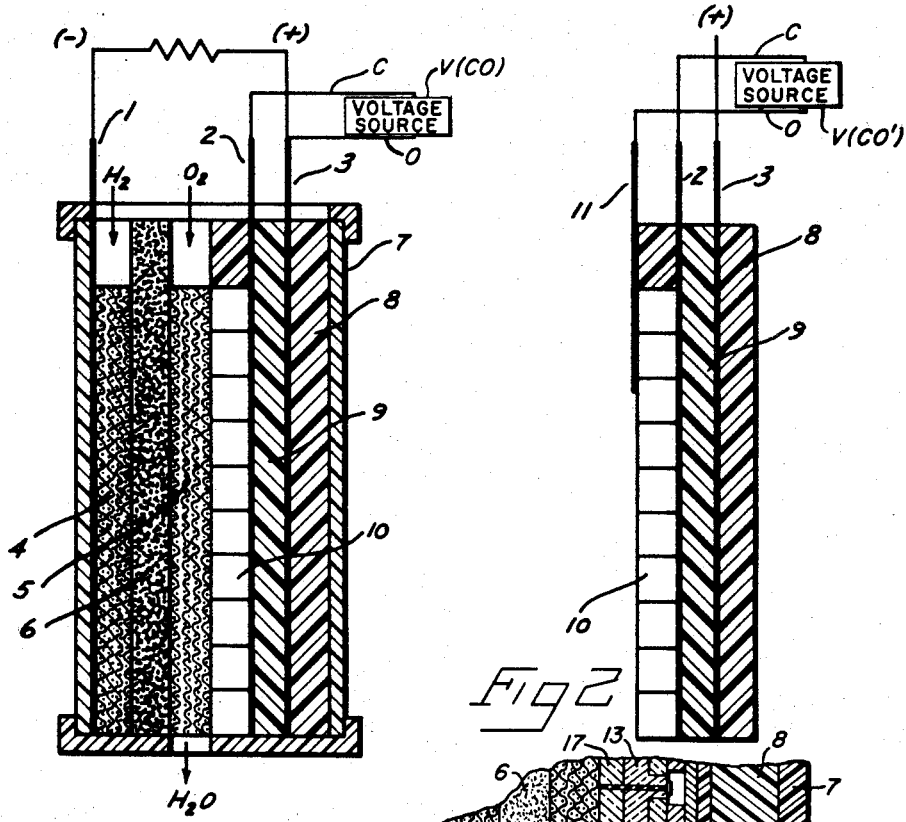
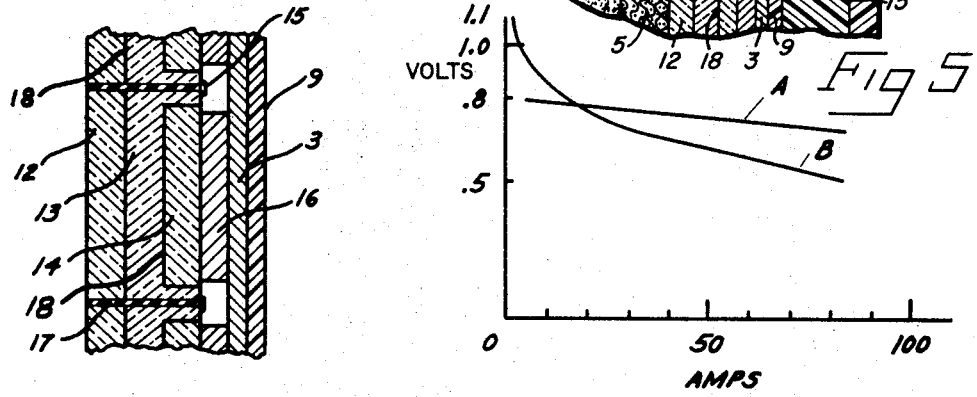
INVENTOR:
Samuel W. Coffman 3,400,305
ALTERNATING CURRENT ELECTRODES FOR
ELECTROCHEMICAL POWER CELLS
Samuel W. Coffman, Anaheim, Calif., assignor of one-
fifth each to Audrey Dinwiddie Coffman, Stephen W.
Coffman, John D. Coffman, and Mark J. Coffman
Filed Aug. 18, 1964, Ser. No. 390,317
10 Claims. (Cl. 317—231)

ABSTRACT OF THE DISCLOSURE

A controlled fuel cell in which electrochemical oxidation and electrochemical reduction occurs at two different electrodes with one of such electrodes (or both electrodes) being of semiconductor material, either of the NPN or PNP type, and being connected to a source of control current for controlling the current flow through the fuel cell such that an undulatory output current flows to a load connected to the fuel cell.

My invention relates generally to electrical powerplants which generate alternating current from a direct current electrochemical source of power, and has particular reference to electrode improvements in multi-cell electric fuel cell batteries which employ liquid electrolyte or solid ion-exchange semipermeable membrane electrolyte.

To obtain alternating current from a direct current source such as a fuel cell or storage battery, it has been necessary to change the current waveform with a static inverter, a rotary inverter, or a D-C motor-generator set. Since all of these devices are relatively heavy, occupy a relatively large amount of space, and require maintenance and repair, they are undesirable. Starting or shutting down such a powerplant has required separate switchgear actuated by manual, mechanical, or electrical means, or any combination of the foregoing. In any case, such switchgear requires separate packaging and wiring, and adds appreciably to the overall mass and volume of the powerplant system. Although this additional mass and volume is not important in some commercial applications, it is undesirable in other instances, particularly where compactness is a valuable asset as in electronic computer centers, small lightweight automobiles and boats, aircraft, and aerospace vehicles. Removal of all these undesirable components form the objects of my invention.

I have discovered that if at least one electrode in a series arrangement of unit electrochemical cells is constructed of single crystal semiconductor elements with doped impurity as described herein and as depicted in the illustrations, delivery of electric energy can be started or stopped by a purely electric control signal without separate switchgear. Current delivered by said arrangement of cells can be either direct or alternating, but not both simultaneously. Alternating current, if desired, has a rectangular waveform of the same frequency and waveform as the aforesaid control signal. Control frequency can be varied from direct current to approximately 800 cycles per second with less than 5% distortion in deliverable power.

I have also discovered that in instances where power generation in a unit fuel cell operating on hydrogen and oxygen is known to be limited by the anode constructed according to the best technology of prior art, namely platinum-black electrodeposited on nickel-plated copper sheet in combination with a platinum-black electrodeposit on nickel screen, such a unit cell produces additional power upon substitution of one of my electrodes with equal cross-section dimensions. This effect is depicted in FIG. 4, wherein the ordinate is voltage, and the abscissa is current through electrodes of 100 square inches cross-sectional area. In FIG. 4, B is a typical voltage-current characteristic of prior art, and A represents the typical root-mean-square voltage-current characteristic with my alternating current (A-C) electrode. Although at low current level the unit cell with my electrode produces less voltage and hence less power than the cell with electrodes of prior art, in the higher current region where the cell is intended to operate the reverse is true and significantly more voltage and power are produced by the cell with my electrode. This same unique effect was observed for a cell which was power-limited at the cathode, using the best electrode of prior art, namely copper oxide surface catalyst on copper sheet in combination with copper oxide-coated copper on copper screen. This electrode was replaced by one of my cathode A-C electrodes of equal cross-sectional dimensions, with results substantially the same as were observed with the anode A-C electrode.

This invention is hereinafter explained in detail with references to the illustrative drawings accompanying and forming a part of this specification, the novel features of the invention being pointed out in the claims appended hereto.

In the drawings:

FIG. 1 is a diagrammatic sectional view of a unit hydrogen-oxygen fuel cell wherein a two-terminal A-C electrode serves as cathode;

FIG. 2 is a diagrammatic sectional view of a three-terminal A-C electrode;

FIG. 3 is a diagrammatic detail section view of an A-C electrode, depicting its structure;

FIG. 4 is a graph depicting the voltage-current characteristics of unit hydrogen-oxygen fuel cells comprising ordinary electrodes (B) and A-C electrodes (A).

In FIG. 1, which represents a hydrogen-oxygen unit fuel cell, hydrogen and oxygen enter through ports in retaining structure 7; control signal V(CO) allows electrochemical reactions to commence; electrochemical reaction product water exits through another port; and electric current passes through the external load. As hydrogen gas enters the hydrogen electrode compartment it permeates platinized catalytic screen 4 where it chemisorbs upon said catalytic screen and also upon the flat planar surface 1 of the negative electrode. Oxygen gas enters the oxygen electrode compartment, permeating the copper oxide catalytic screen 5 where it is chemisorbed or physically adsorbed onto the surfaces of said catalytic screen and flat planar section 10 of the A-C electrode. Upon application at terminal C of a series of positive voltages V(CO) as referred to terminal O, electrochemical reactions are:

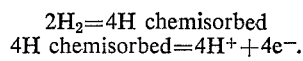

Electrons so formed enter the metal structure of the hydrogen electrode 1 and commence to drift through the external power circuit. Simultaneously with formation of electrons at the hydrogen electrode, the same number of electrons appear at the positive or oxygen electrode depicted as 10 in FIG. 1 and 11 in FIG. 2, where they enter into electrochemical combination with oxygen and water according to the equations:

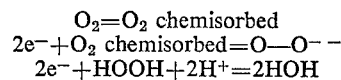

Hydrogen ions formed at the hydrogen electrode 1 migrate through the cation exchange semipermeable membrane 6 to oxygen 10 or 11 where they react chemically as heretofore described.

Thus I proceed to construct my A-C electrodes. FIG. 3 represents a diagrammatic cross-section view of a square wafer of single crystal silicon or germanium which has been doped with certain chemical elements in trace amounts so as to obtain either an npn or pnp structure, as required, and with abrupt pn junctions 18 formed as indicated. Said abrupt pn junctions are formed in each single crystal element by either epitaxial or diffusion processes. Although semiconductor sections of greater surface area can be prepared, I have formed a preference based upon consideration of quality control, cost, and availability, for surface dimensions of 2.0 inch x 2.0 inch with thickness of 0.050 inch. Wafers in shapes of equilateral triangles, hexagons, and rectangles are also satisfactory.

To prepare a silicon npn wafer with said preferred dimensions, I proceed as follows. Starting with silicon crystal material which has been doped with p-type impurity 13, preferably boron, 2.05 x 2.05 x 2.05 inch wafers are formed by ordinary sawing and grinding processes. Volume electrical resistivity of these wafers must lie within the range of 0.5 to 5.0 ohm centimeters. Masking material is applied (1) to all edges and (2) to the surface on one side only, starting from the edge and extending inward 0.085 to 0.095 inch, continuing around the surface back to the starting point so as to complete a square annular ring. Said masked wafers are then doped with phosphorous by either diffusion or epitaxial processes on all exposed surfaces simultaneously to such extent that surface layers are changed from p-type to n-type 12 and 14, with surface resistivity 0.05 to 1.0 ohm, and abrupt pn junctions 18 are formed from 5 to 10 microns below the surface of one side as illustrated in FIG. 3. Masking material is removed and all edges are ground to obtain the aforesaid finish dimensions.

A typical useful application for my A-C electrode is a battery comprising 36 unit hydrogen-oxygen fuel cells in electric series. At least one of said unit fuel cells incorporates one of my A-C electrodes as depicted by FIG. 2, and as illustrated in FIG. 1. The remaining cells incorporate ordinary electrodes of prior art. Each electrode in aforesaid fuel cell battery presents a square, flat, active surface with dimensions of 10 inch x 10 inch.

To construct my A-C electrode for use in the oxygen compartment of said fuel cell, I select 25 silicon npn wafers prepared as previously described. On the flat surface of a metal plate with dimensions greater than 10 inch x 10 inch and covered with a thin continuous film of Teflon, I arrange said wafers in a mosaic pattern composing a square surface figure of overall dimensions 1.0 x 10.0 inches. Polyurethane impregnating resin, without solvent, heated to such temperature that its viscosity is less than 100 centipoise, is admitted through a hand-operated syringe with glass delivery tube drawn to capillary form, to each capillary region 17 between said wafers and to all outside edges. Plate and mosaic of wafers are then transferred to an oven where polymerization of the impregnating resin proceeds to conclusion. Said plate and mosaic are then transferred from the oven, and excess resin is removed from the surface of said mosaic by ordinary lapping or grinding techniques.

With individual wafers thus affixed in the shape of the aforesaid square figure, a strippable masking resin film is applied in the form of a square annular ring on each individual wafer. Outside edge of said ring is placed 0.033 inch inward from edge of said wafer; width of film is 0.067 inch. After curing said strippable mask, the mosaic is immersed in an electroless gold plating bath where a gold film of strike dimensions is deposited on all surfaces of said mosaic. A strike film shall be understood herein to be 0.1 to 5.0 microinches thick, and electrically continuous from any point on said film to any other point on said film. Mosaic is then transferred to an electroless nickel plating bath wherein nickel strike film is deposited over aforesaid gold strike film. Aforesaid gold and nickel strikes are deposited satisfactorily by using standard commercial processes. Aforesaid strippable mask is removed.

Control signal terminal grid, a square grid structure 2.0 x 2.0 inches with cross-section 0.032 x 0.067 inch, depicted as 15 in FIG. 3 and as 2 in FIG. 1, is then soldered to the wafer mosaic so as to be joined across wafer boundaries depicted as 17 in FIG. 3 and as 10 in FIG. 1. Soft solder and rosin flux are used in said soldering process. Said control signal terminal grid is a structure which may be formed in several ways, as follows. Starting with commercial-grade copper sheet of dimensions 0.032 x 10.08 x 10.48 inches, square sections 1.96 x 1.96 inches are stamped out or milled so that the open grid figure thus formed corresponds with wafer boundaries in the mosaic. To said grid is applied a nickel electroplated film of 0.1 to 1.0 mill-inch thickness. Grid is thus prepared in readiness for joining to wafer mosaic. Another method more suitable for production in greater quantity is to partially flatten American Wire Gage No. 18 copper wire by passing it through rollers set 0.032 inch apart. Wire thus flattened is electroplated with 0.1 to 1.0 milli-inch thick nickel film. Wire is then dipped in (1) an alcoholic rosin flux solution; (2) molten solder of approximately lead-tin eutectic composition; (3) once more in said rosin solution. Wire so prepared can be joined to mosaic across wafer boundaries 17 by application of heat and pressure, thus forming control signal grid 15. Procedure for said joining process is as follows. Mosaic and wire are arranged in a jig prepared so as to constrain said wire to the form of the aforesaid control signal grid. Said jig comprises a support plate for aforesaid mosaic, fixed blocks to laterally constrain wire, and a movable piston with an extended section of the same general shape as the control signal grid. With mosaic and wire in place, pressure exerted on movable piston forces wire and mosaic together. Heat applied by metal plates to movable piston and mosaic support plate fuses flux and solder, thereby joining control signal grid terminal to the wafer mosaic. Heat is removed; pressure is maintained on piston until molten solder has solidified. Jig is then disassembled and the mosaic-control signal terminal assembly is removed.

Power terminal 3 in combination with protruding sections 16 is then soldered to wafer mosaic 10 as indicated in FIG. 3, using soft solder in sheet form and rosin flux, and a suitably prepared positioning jig. Said power terminal comprises a structure formed as follows. To nickel-plated commercial-grade copper sheet 3 of dimensions 0.032 x 10.0 x 10.44 inches are spot-welded 25 wafers of nickel-plated commercial-grade copper sheet of dimensions 0.064 x 1.80 x 1.80 inches, located in regular order and depicted as 16 is FIG. 3.

Aforesaid impregnating resin is then applied to the voids between control signal terminal 15 and power terminal structure 16 and 3 as depicted in FIG. 3 and to all exposed surfaces of terminals 2 and 3. The electrode structure is then transferred to an oven for polymerization of said resin to the solid state, thus forming insulating material 9 and 8, and completing construction of an npn A-C electrode.

Thus I proceed to construct catalytic storage sections. Although several forms of catalytic storage are known and used widely, I prefer a metal wire screen coated with a thin film of catalytic material which serves to both chemisorb or otherwise physically adsorb incoming fuel, thereby storing it in readiness for electrochemical reaction, and catalyzing said electrochemical reaction when external control allow said electrochemical reaction to proceed.

For use with the hydrogen electrode, I proceed to prepare catalytic storage sections depicted as 4 in FIG. 1. I prepare screen assemblies of platinum-black surface on nickel wire screen. For example, to fabricate screen assemblies for a unit hydrogen-oxygen fuel cell, I prepare a single flat, rectangular piece 10.5 inches wide x 84.0 inches long, composed of nickel wire cloth in simple square pattern, also known as plain weave, also known as square mesh, with 100 meshes per lineal inch x 100 meshes per lineal inch, with wire size 0.005 inch, and resulting in 25% open area. Beginning at a line 10.0 inches from the 10.5 inches side, I fold the screen at said line, press it flat and spot-weld the loose end to the screen. I place the spot-welds one inch apart. I then continue to fold and press said screen in a single direction to obtain a flat, rectangular shape of approximately 10.5 x 10.5 x 0.040 inches containing eight layers of screen material. I then join the outside loose end to the remainder of the screen by spot-welding to a strip of nickel sheet metal 0.020 inch thick x 0.065 inch wide x 10.0 inches long, placing spot-welds one inch apart. Thus I prepare a catalytic screen assembly 4 as exemplified in FIG. 1. To fabricate a catalytic screen assembly which is to be used in combination with the three-terminal A–C electrode as exemplified by FIG. 2, I proceed by the same method as heretofore described for the simple screen of FIG. 1, except for the last spot-welding step. I secure the outside loose end to the remainder of the screen by spot-welding a piece of nickel sheet metal 0.020 inch x 10.0 inches long x 0.065 inch wide across most of the 10-inch length, excepting for a section 0.25-inch length x 0.50-inch wide which provides for the exterior signal terminal when, in later assembly into the fuel cell, the exterior terminal lug 11 is spot-welded to this extended section. I prepare the catalytic surfaces of screen assemblies with or without control signal terminals by electrodepositing a platinum-black microcrystalline film to a uniform thickness of 0.0002 inch upon said screens from an acidic salt solution of platinum according to any of the standard electrochemical processes used for this purpose. These processes are occasionally identified as modifications of the original Kohlrausch procedure.

For use with oxygen electrode, I proceed to construct catalytic screen sections using techniques similar to those used for the hydrogen electrode screens. All physical dimensions of screen, joining strip, and control signal terminal strip are the same as those of the hydrogen electrode screen assemblies. Material throughout is commercial-grade copper. Although spotwelding is an acceptable method of joining these copper parts, the method sometimes leads to unexpected difficulties. I prefer joining all copper-to-copper parts with lead-tin solder containing approximately 5 weight percent silver. After fabricating the screen assemblies in the aforesaid manner, I then prepare the catalytic surface of reddish cuprous oxide by following this procedure: (1) immerse each screen assembly three times, for one second each time, in chlorinated hydrocarbon; (2) immerse three times in boiling water, one second each; (3) immerse in nitric acid consisting of 30–40 weight percent nitric acid in water of 60–80 deg. F, for 30 seconds while mechanically agitating the screen assembly; (4) immerse three times, 20 seconds each, in 1.0 normal sodium bicarbonate solution; (5) immerse three times, 20 seconds each in pure water, being certain that no batch of pure water is used for more than one immersion; (6) admit to oven with filtered fresh air atmosphere at 300 deg. F., for 30 minutes. If in the aforesaid nitric acid dipping step, reaction proceeds in a non-uniform manner along the surface as evidenced by greater gas formation at one place than another. I use a small hand-operated syringe to squirt small increments of concentrated nitric acid, composed of 70 weight percent nitric acid in water, across the surface where reaction is lagging. If after the first such treatment the reaction is still not entirely uniform, I repeat the process until uniformity is achieved. But in no case is the time of screen immersion in nitric acid allowed to exceed the aforesaid limits.

Another construction of catalytic storage section which I have found useful comprises sintered porous granules of either spherical or irregular shape of thickness no greater than 0.030 inch retained within a rectangular square mesh metal screen of 100 meshes per lineal inch x 100 meshes per lineal inch x 0.005 inch diameter wire. For use with the hydrogen electrode, said granules and screen are commercial-grade nickel coated with an electrodeposit of platinum-black microcrystalline film which is continuous and approximately 0.0002 inch thick. For use with the oxygen electrode, said granules and screen are commercial-grade copper coated with a continuous film of reddish copper oxide which is prepared in the manner heretofore prescribed for the catalytic screen assembly. When I desire to include an exterior control signal terminal, said terminal 11 is joined to said metallic screen holder in the same manner as heretofore described for the catalytic screen assembly.

I use all before-described forms of my semiconductor electrodes in fuel cells. Where maximum efficiency of power production is not required, I use only one semiconductor electrode in one cell of a series stack of cells. If there are no adverse considerations, I normally choose to use the two terminal configuration at the oxygen electrode, since this form is the least complex and least expensive to fabricate. If I require maximum power efficiency in a fuel cell battery, I use my semiconductor electrodes throughout to the complete exclusion of ordinary electrode. I then prefer the two terminal npn form at each oxygen electrode, and the two terminal pnp from at each hydrogen electrode. If practical consideration of cost and availability are dominant, I may choose to use a single semiconductor type throughout. Thus I may use npn silicon in the three terminal configuration for each hydrogen electrode, and npn silicon in the two terminal configuration for each oxygen electrode.

All these preferences as heretofore described apply to a hydrogen-oxygen fuel cell with cation semipermeable membrane comprising fixed acidic ion groups in a polymeric matrix. Typical of said membranes is sulfonated polystyrene prepared according to procedures described in U.S. Patent 2,636,851 (Juda, W. and McRae, W. A., Apr. 28, 1953). Applied to other types of fuel cells, these preferences might reverse in type or otherwise alter, but not necessarily.

All of the various combinations of electrodes, any of which may be useful in a particular instance, are summarized here in tabular form:

| Electrode | Oxygen | | Hydrogen | |
|---|---|---|---|---|
| Terminals, quantity | 2 | 2 | 3 | |
| Terminals, designation | C,O | C, O, O¹ | C, H | C, H, H' |
| Semiconductor Type | NPN | PNP | PNP | NPN |
|  | Si or Ge | Si or Ge | Si or Ge | Si or Ge |
| Control signal | V(CO) | V(CO') | V(CH) | V(CH') |

Control signal V(CO) is typically a series of positive voltage pulses at C referred to O; V(CO'), negative voltage pulses at C referred to O'; V(CH), negative voltage pulses at C referred to H; V(CH'), positive voltage pulses at C referred to H'.

My A-C electrodes may generally be used in any kind of fuel cell or battery, the only constraint being degree of corrosive attack by electrolyte. At the anode where electrochemical oxidation occurs, the before-described hydrogen A-C electrode is used; at the cathode where electrochemical reduction occurs, the before-described oxygen A-C electrode is used.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and therefore such adaptations should and are intended to be comprehended within the meaning and range of equivalency of the following claims.

I claim:

1. An electrical fuel cell potential source, comprising a first electrode body having a surface including hydrogen chemisorbing means for producing hydrogen ions, a second electrode body comprising a first section including chemisorbing means exposed on the front face thereof for producing oxygen ions and water, said second electrode body having a second section forming the rear side of said second electrode, said second section including a semiconductor wafer having respective regions of opposite type conductivity forming a PN junction disposed in a plane at least partially flatwise to the front face of said second electrode, said PN junction having external terminals for voltage control, means for separating said first and second electrode bodies for passage of ions betwen said chemisorbing means on said bodies, port means for supplying hydrogen and oxygen respectively to the first and second mentioned chemisorbing means, and means for removing said water from the second mentioned chemisorbing means.

2. A potential source as set forth in claim 1 in which a semipermeable spacer is disposed between and separates said first and second electrode bodies.

3. A potential source as set forth in claim 1 in which a voltage source is connected to said external terminals for voltage control of said junction.

4. A potential source as set forth in claim 1 in which an output load is connected in electrical series circuit with said junction, and a source of voltage is connected to said external terminals of said junction.

5. A potential source as set forth in claim 1 in which said semiconductor wafer is a doped single crystal semiconductor.

6. An electrical fuel cell potential source, comprising a first electrode body having a surface including oxygen chemisorbing means for producing oxygen ions and water, a second electrode body comprising a first section including chemisorbing means exposed on the front face thereof for producing hydrogen ions, said second electrode body having a second section forming the rear side of said second electrode, said second section including a semiconductor wafer having respective regions of opposite type conductivity forming a PN junction disposed in a plane at least partially flatwise to the front face of said second electrode, said PN junction having external terminals for voltage control, means for separating said first and second electrode bodies for passage of ions between said chemisorbing means on said bodies, and port means for supplying oxygen and hydrogen respectively to the first and second mentioned chemisorbing means, and means for removing said wafer from the first mentioned chemisorbing means.

7. A potential source as set forth in claim 6 in which a semipermeable spacer is disposed between and separates said first and second electrode bodies.

8. A potential source as set forth in claim 6 in which a voltage source is connected to said external terminals for voltage control of said junction.

9. A potential source as set forth in claim 6 in which an output load is connected in electrical series circuit with said junction, and a source of voltage is connected to said external terminals of said junction.

10. A potential source as set forth in claim 6 in which said semiconductor wafer is a doped single crystal semiconductor.

References Cited

UNITED STATES PATENTS

| | | | |
|---|---|---|---|
| 2,914,596 | 11/1959 | Gorin et al. | 136—86 |
| 2,930,722 | 3/1960 | Ligenza | 317—234.5 |
| 3,146,131 | 8/1964 | Linden et al. | 136—86 |

JAMES D. KALLAM, *Primary Examiner.*